(12) United States Patent
Bastug et al.

(10) Patent No.: US 8,295,327 B2
(45) Date of Patent: Oct. 23, 2012

(54) METHOD AND APPARATUS FOR ESTIMATING NOISE VARIANCE

(75) Inventors: Ahmet Bastug, Istanbul (TR); Eric Alliot, Cagnes sur Mer (FR)

(73) Assignee: ST-Ericsson SA, Geneva (CH)

( * ) Notice: Subject to any disclaimer, the term of this patent is extended or adjusted under 35 U.S.C. 154(b) by 480 days.

(21) Appl. No.: 12/300,986

(22) PCT Filed: May 10, 2007

(86) PCT No.: PCT/IB2007/051774
§ 371 (c)(1),
(2), (4) Date: Apr. 24, 2009

(87) PCT Pub. No.: WO2007/132412
PCT Pub. Date: Nov. 22, 2007

(65) Prior Publication Data
US 2010/0027589 A1 Feb. 4, 2010

(30) Foreign Application Priority Data
May 17, 2006 (EP) .................................. 06300478

(51) Int. Cl.
*H04L 1/20* (2006.01)
*H04B 1/707* (2011.01)

(52) U.S. Cl. ........ 375/147; 375/130; 375/227; 375/260; 375/346

(58) Field of Classification Search .................. 375/227, 375/346, 148; 455/63.1, 67.13; 702/191, 702/189, 69
See application file for complete search history.

(56) References Cited

U.S. PATENT DOCUMENTS

| | | | | |
|---|---|---|---|---|
| 6,957,175 | B2 * | 10/2005 | Shin et al. | 702/191 |
| 7,313,167 | B2 * | 12/2007 | Yoon et al. | 375/148 |
| 2004/0203397 | A1 | 10/2004 | Yoon et al. | |

FOREIGN PATENT DOCUMENTS

JP     EP 1 143 632 A     10/2001

OTHER PUBLICATIONS

PCT International Search Report PCT/IB007/051774, mailing date May 11, 2007, pp. 1-4.
PCT Written Opinion of the International Searching Authority, PCT/IB2007/051774, pp. 1-6.

* cited by examiner

*Primary Examiner* — David Ometz
*Assistant Examiner* — Ross Varndell
(74) *Attorney, Agent, or Firm* — William J. Kubida; Peter J. Meza; Hogan Lovells US LLP

(57) ABSTRACT

The invention is directed towards a method and apparatus for estimating a noise variance in a receiver of a code multiplex telecommunications system with orthogonal spreading codes, wherein respective real and imaginary parts of a sum and a difference of two estimated symbols having substantially same amplitudes are determined, and then respective minimum energy components of the determined real and imaginary parts of the sum and difference are determined. The respective minimum energy components are finally combined to obtain the noise variance. Thereby, noise variance can be estimated simply based on addition and comparison operations, which reduces complexity and processing load.

21 Claims, 4 Drawing Sheets

METHOD AND APPARATUS FOR ESTIMATING NOISE VARIANCE

CROSS-REFERENCE TO RELATED APPLICATIONS

This application claims the benefit of International Application No. PCT/IB2007/051774, filed on May 10, 2007 and European Application No. 06300478.2 filed on May 17, 2006, both of which are incorporated by reference for all purposes as if fully set forth herein.

FIELD OF THE INVENTION

The invention is directed towards an apparatus and method of estimating a noise variance in a receiver of a code multiplex telecommunications system with orthogonal spreading codes. As an example, aspects of the invention relate to a receiver apparatus and estimation method for Orthogonal Variable Spreading Factor (OVSF) codes in a downlink Frequency Division Duplex (FDD) channel of the Universal Mobile Telecommunications System (UMTS) Release-5 standard.

BACKGROUND OF THE INVENTION

Code Division Multiple Access (CDMA) systems are based on a digital wideband spread spectrum technology in which multiple independent user signals are transmitted across an allocated segment of the available radio spectrum. In CDMA, each user signal comprises a different orthogonal code and a pseudo random binary sequence that modulates a carrier, thereby spreading the spectrum of the waveform and thus allowing a large number of user signals to share the same frequency spectrum. The user signals are separated in the receiver with a correlator which allows only the signal with the selected orthogonal code to be de-spread. Other user signals whose codes do not match are not de-spread and as such contribute to system noise. In 3rd generation Wideband CDMA (WCDMA) different spreading factors and variable user data rates can be supported simultaneously.

By the use of spreading codes, the frequency band of a transmission signal is spread to a chip rate, which is larger than the actual data or information symbol array. For example, if the used spreading code has the length of eight data symbols (referred to as "chips"), eight chips are transmitted for every data symbol. The property of unique codes is given by the property of orthogonality of the spreading codes meaning in mathematical terms that the inner product or correlation respectively of the spreading codes used or to use for communication is zero. Orthogonality of the spreading codes guarantees that transmission of a signal or sequence of data symbols respectively which is coded by a spreading code neither creates or propagates side effects to other signals coded by other orthogonal spreading codes and corresponding to other users of a communication system. A receiver looking for a certain spreading code of a certain transmitter will take signals coded by orthogonal spreading codes as a noise of the radio frequency (RF) channel. Since spreading codes can have different length, the property of orthogonality must be given also for spreading codes of different lengths.

FIG. 1 shows a graphical representation of an orthogonal variable spreading factor (OVSF) tree, which can be used for construction of a spreading code, wherein the abbreviation "SF" designates the spreading factor characterizing the length of the spreading code and the level of the OVSF tree. Within each tree level, the available spreading codes have the same length and are orthogonal. The spreading factor may also be expressed by at the ratio between chip rate and data symbol rate or between chip duration and data symbol duration. Spreading codes of different users may fall into different levels in an OVSF tree thus providing various levels of quality of service (QoS). User symbols may be spread by spreading factors ranging from 4 to 512.

Channel equalization is especially interesting for the downlink of the newly introduced third generation Universal Mobile Telecommunication System with frequency-division duplex (FDD-UMTS). In contrast to the uplink transmission, the signals of all users transmitted from the base station are received synchronously at a specific mobile terminal. Separation between user-signals is achieved by applying unique orthogonal spreading codes to each of them. Multipath propagation destroys the orthogonality, causing strong multiple-access interference (MAI) and inter-symbol interference (ISI) for small spreading factors. Hence, by equalizing the received chip sequence, the orthogonality between user-signals can be restored. Especially for high data rates services like High Speed Downlink Packet Access (HSDPA), the performance of conventional rake receiver is limited. This receiver coherently combines the different receiving paths but cannot suppress the intra-cell interference due to the non-zero cross-correlations between the arbitrarily time-shifted spreading codes assigned to the different users. Advanced receivers are necessary to mitigate the severe effect of MAI and ISI.

The signal-to-noise ratio (SNR) is broadly defined as the ratio of the desired signal power to the noise power and has been accepted as a standard measure of signal quality. Adaptive system design requires the estimate of SNR in order to modify the transmission parameters to make efficient use of system resources. Poor channel conditions, reflected by low SNR values, require that the transmitter modify transmission parameters such as coding rate, modulation mode etc. to compensate channel distortions and to satisfy certain application dependent constraints such as constant bit error rate (BER) and throughput. Dynamic system parameter adaptation requires a real-time noise power estimator for continuous channel quality monitoring and corresponding compensation in order to maximize resource utilization. SNR knowledge also provides information about the channel quality, which can be used by handoff algorithms, power control, channel estimation through interpolation, and optimal soft information generation for high performance decoding algorithms. The SNR can be estimated using regularly transmitted training sequences, pilot data or data symbols (blind estimation).

However, white noise is rarely the case in practical wireless communication systems where the noise is dominated by interferences, which are often colored in nature. Therefore, it has been proposed to estimate noise variances at each subcarrier to obtain estimates of noise-plus-interference variance and calculate a resultant signal-to-noise-plus-interference (SINR) ratio. These noise-plus-interference estimates are specifically useful for adaptive modulation, and optimal soft value calculation for improving channel decoder performance. Moreover, it can be used to detect and avoid narrowband interference.

Hence, the goal is to estimate the variance of the noise-plus-interference over the symbol estimates in the mobile terminal, e.g., UMTS user equipment, where the term "noise" is intended to mean additive white Gaussian noise which can be modeled to have two components: thermal noise due to random motion of electrons in the receiver circuitry and the intercell (co-channel) interference originating from the surrounding cells. Additionally, the term "interference" is intended to mean distortion coming from the codes in the same cell with the code of interest whose symbols we are estimating.

The U.S. Pat. No. 6,957,175 B2 discloses a method and apparatus for estimating a signal-to-interference ratio (SIR) of baseband signals which are received and processed by a data demodulator to provide demodulated signals to a SIR estimator. The SIR estimator receives the demodulated symbols from the data demodulator and estimates the average signal power of the demodulated symbols as a function of a median based average power value and a mean based average power value of the demodulated symbols for each quadrant of a quadrature phase shift keying (QPSK) constellation. The SIR estimator estimates the average effective interference power of the demodulated symbols and calculates the SIR by dividing the estimated average signal power of the demodulated symbols by the estimated average effective interference power of the demodulated symbols. However, this known estimation scheme is very complex, since it uses a very complicated median filtering operation which requires buffering a lot of QPSK symbol estimate samples, a sorting mechanism, median filtering operations which result in much buffering and computational complexity burden.

SUMMARY OF THE INVENTION

An advantage of the invention is to provide a simple method and apparatus for noise plus/or interference variance estimation, thereby which complexity can be reduced.

This object is achieved by an apparatus as claimed in claim 1 and an estimation method as claimed in claim 12.

Accordingly, noise variance can be estimated simply based on addition and comparison operations, which reduces complexity and processing load. Moreover, an unbiased estimation is provided, thereby the expected (average) value of the noise variance estimate is a true value.

The estimated symbols may be spread by the same spreading factor, to thereby minimize processing steps for estimation. Furthermore, as an example, the estimated symbols may be consecutive estimated symbols. This provides the advantage that substantially equal amplitudes can be assumed at consecutive symbol instants.

Additionally, the combining unit may comprise an adding unit to add the respective minimum energy components and dividing unit to dividing the output of the adding unit by two.

The apparatus may be adapted to determine a moving average of estimated noise variances during a predetermined number of consecutive symbols. Additionally or as an alternative, the apparatus may be adapted to obtain estimated noise variances for at least two different codes, and to apply a weighted average among the at least two different codes. The weighting may be based on respective spreading factors of the at least two different codes. Both options lead to an improved quality of estimation.

The proposed noise variance estimation can be used for SINR estimation or amplitude estimation in linear receivers.

Further advantageous developments are defined in the dependent claims.

BRIEF DESCRIPTION OF THE DRAWINGS

Aspects of the invention will now be described based on preferred embodiments with reference to the accompanying drawings in which.

DESCRIPTION OF THE PREFERRED EMBODIMENTS

In the following, the preferred embodiment will be described based on a HSDPA data access system according to the Release-5 specification of the UMTS standard. HSDPA has been developed to provide high data rates in the downlink direction.

Figure 1:
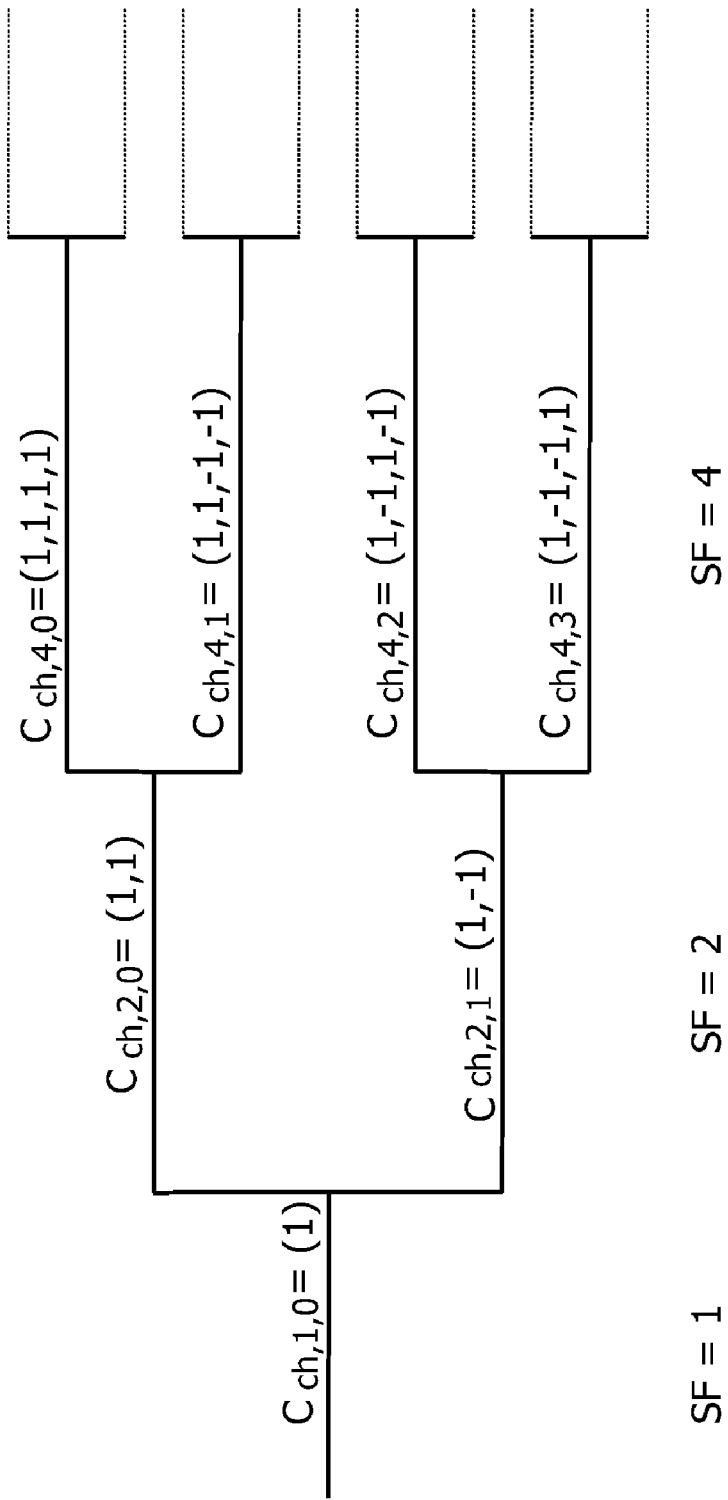
FIG. 1 shows a graphical representation of an orthogonal variable spreading factor (OVSF) tree.

The receiver may have an adaptive interference suppression algorithm, which is based on channel equalization and suitable for synchronous CDMA systems using orthogonal spreading codes with code scrambling. In particular, the receiver does not need any training sequence or training information for the adaptation of the equalization. It only needs initialization weights, which might or might not need a channel estimation scheme that requires a training sequence. A channel impulse response estimator operates to estimate the impulse response of the channel and provides reference input factors or weights to an adaptive chip estimator in order to provide initialization weights. The output of the adaptive chip estimator is coupled to a symbol-synchronized code correlator. The correlator de-spreads the output of the adaptive chip estimator by multiplying it with the output of a code generator, and then integrating over the symbol period. The code generator is capable of generating a required spreading code according to the above OVSF tree of FIG. 1. The output of the correlator is coupled to a conventional de-interleaver, which is coupled to a conventional decoder, which outputs data decisions.

Estimation of noise-plus-interference variance can be used for several purposes, such as signal-to-interference-plus-noise-ratio (SINR) estimation, which is sometimes also denoted as signal-to-noise-ration (SNR) or signal-to-interference-ration (SIR) in other contexts, and symbol amplitude estimation. It can also be used for channel quality indication (CQI) measurement purposes for giving feedback to the BS about the instantaneous link quality. This latter case is used for example in HSDPA for supporting the base station to achieve link adaptation, i.e. to adapt the modulation scheme, e.g., quadrature phase shift keying (QPSK) or 16 state quadrature amplitude modulation (16-QAM), or to adapt the channel coding rate or puncturing rate or to decide for whether to give service to the user or not (schedule) etc.

QPSK modulation has +1 or −1 values in the real or imaginary parts. Accordingly, if two noise-free and equal amplitude QPSK symbols $a_1$ and $a_2$ are added or subtracted, i.e., $(a_1+a_2)$ and $(a_1-a_2)$, the real part of one of the two real outcomes will be zero. Similarly the imaginary part of one of the two imaginary outcomes will be zero. If the symbols are not noise-free, i.e. they are estimates, then the real and imaginary outcomes corresponding to the zero values in the noise-free case will carry respectively only the real and imaginary noise-plus-interference but no useful signal.

Figure 2:
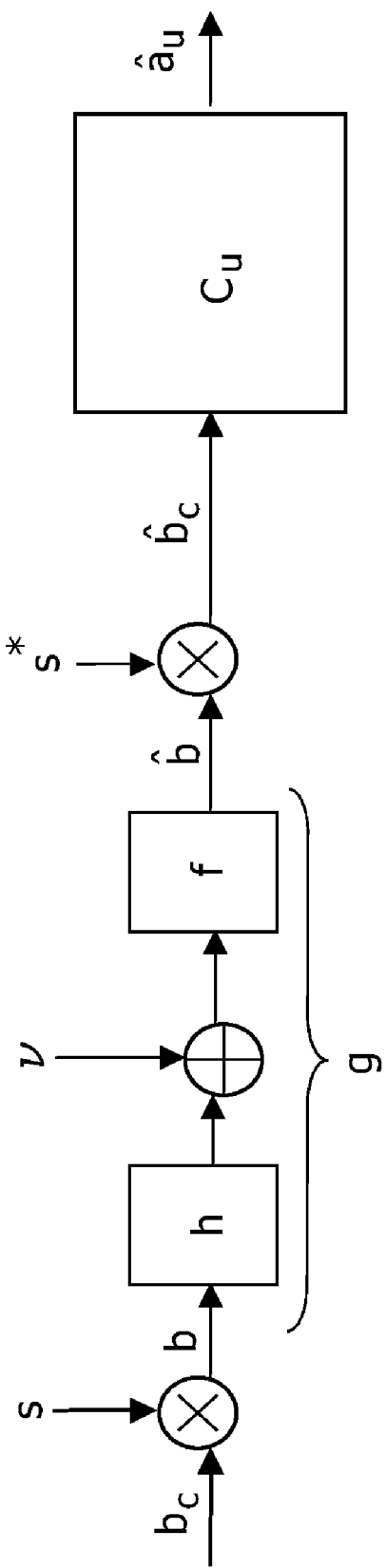
FIG. 2 shows a schematic functional block diagram of a downlink communication chain.

FIG. 2 shows a schematic functional block diagram of a downlink communication chain. User-assigned dedicated channels, like the dedicated physical channel (DPCH), and some common channels, like the common pilot channel (CPICH) and the common physical control channel (CPCCH), are examples of channels for transmission of QPSK modulated codes which can be used for the of noise-plus-interference variance estimation purposes in R99 UMTS FDD downlink system. In addition to these known codes, HSDPA compliant mobile terminals might have the knowledge of a number QPSK-modulated HSDSCH codes during HSDPA service mode.

Referring to FIG. 2, a transmitted scrambled total chip level signal b at the base station is obtained by scrambling a total chip level signal $b_c$ at the base station, which corresponds to the sum of chip sequences of all the users in the same cell, with a scrambling code or sequence s. The scrambled total chip level signal b is passed through a discrete time overall channel h which is the sampled form of a cascade of transmission pulse shaping, multipath propagation, and analog receiver front-end filtering. Then, intercell interference plus white Gaussian noise v is added, and the total signal is supplied to a linear filter f which is the chip level filter and which can be an equalizer, a channel matched filter, a linear multiuser detector or any other linear filter adapted to de-convolve or suppress distortion impact of the channel h. At the filter output, an estimate $\hat{b}$ of the scrambled total chip level signal b is obtained. After this filtering the signal passes through descrambling by a descrambling code or sequence s*, to obtain an estimate $\hat{b}_c$ of the total chip level signal $b_c$, and arrives at the input of a despreading unit $C_u$. It is noted that there can be several parallel despreading units to obtain symbols of different users.

According to the preferred embodiment, the processing of the despreading unit $C_u$ is real-valued. As the input sequence to the despreading unit $C_u$ is complex, the despreading unit $C_u$ will simply process the real and imaginary parts independently. Real part will be output as real component and imaginary part will be output as imaginary component.

The SINR expression on the obtained total chip level signal $b_c$ for an unbiased receiver is given as:

$$SINR(b_c) = \frac{\sigma_b^2}{(\|g\|^2 - 1)\sigma_b^2 + \|f\|^2 \sigma_v^2} = \frac{\sigma_b^2}{\sigma_n^2} \quad (1)$$

where $\sigma_b^2$ is the variance of total chip level signal $b_c$ at the base station, $\|g\|^2$ is the energy of the effective channel g, $\|f\|^2$ is the energy of the unbiased filter f, $\sigma_v^2$ is the variance of the intercell interference plus noise v, $(\|g\|^2-1)\sigma_b^2$ is the intracell interference variance, and $\sigma_n^2$ is the total interference-plus-noise variance to be estimated. The parameter $$\gamma = \frac{1}{\|g\|^2}$$

is known as the orthogonality factor of the unbiased filter f. The SINR expression for biased filters is slightly different but the far right hand expression $$\frac{\sigma_b^2}{\sigma_n^2}$$

in equation (1) is the same and the treatment is valid also for biased filters.

The SINR on the symbols of the user of interest is equal to:

$$SINR(a_u) = \frac{\sigma_{a_u}^2}{\sigma_{n_u}^2} = \frac{L_u^2 \sigma_{b_u}^2}{L_u \sigma_n^2} = \frac{\sigma_{a_u}^2}{L_u \sigma_n^2} \quad (2)$$

where $L_u$ is the spreading factor for the user of interest, $\sigma_{b_u}^2$ is the chip level variance for the user of interest, and $\sigma_{a_u}^2$ is the symbol variance (power) of the user of interest.

The denominator term in equation (2) does not depend on the code identity. Furthermore, the denominator term in equation (2) only linearly depends on the spreading factor. In view of this, it can be concluded that if the value of the denominator term for one code is determined, multiplying or dividing by the spreading factor ratio of the two codes can simply obtain the same term for the other code.

As already mentioned above, the function of the despreading unit $C_u$ is real-valued. Hence, the input and output of the despreading unit $C_u$ can be separated into real (I) and imaginary (Q) branches. If one code is actively assigned to a user from the OVSF tree in FIG. 1, then its parent or child codes cannot be assigned to any other user, i.e., they are inactive.

Figure 3:
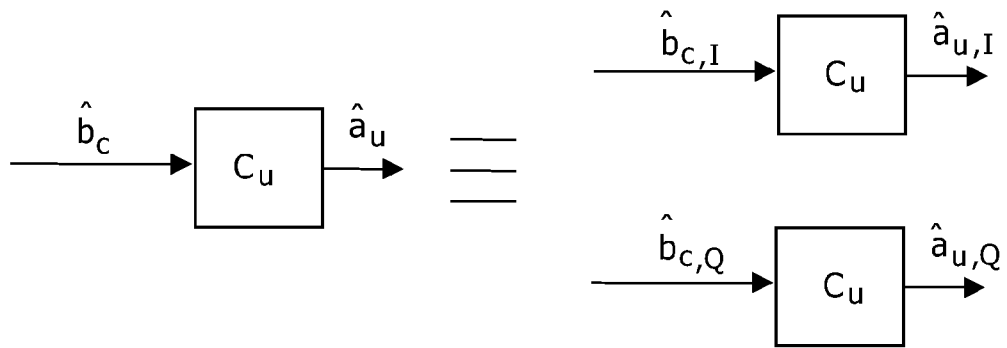
FIG. 3 shows a block diagram of a parallel implementation of I-Q separation of a despreading operation.

FIG. 3 shows a block diagram of a parallel implementation of I-Q separation and independent processing at the despreading unit $C_u$ of FIG. 2. For noise-plus-interference variance estimation in the preferred embodiment, two equal amplitude QPSK symbols are operated on. As an example, two consecutive symbols can be used, assuming that the amplitude does not (substantially) change between two symbol intervals. Then, by simply adding and subtracting them and summing the minimum energies of the real and imaginary parts obtained from simple two-input comparators, the noise-plus-interference variance can be calculated. Since two symbols are used, the output can be normalized by dividing it by 2. This adding and subtracting of two consecutive symbols is in fact equivalent to despreading with the two closest child codes as shown in FIG. 4.

Figure 4:
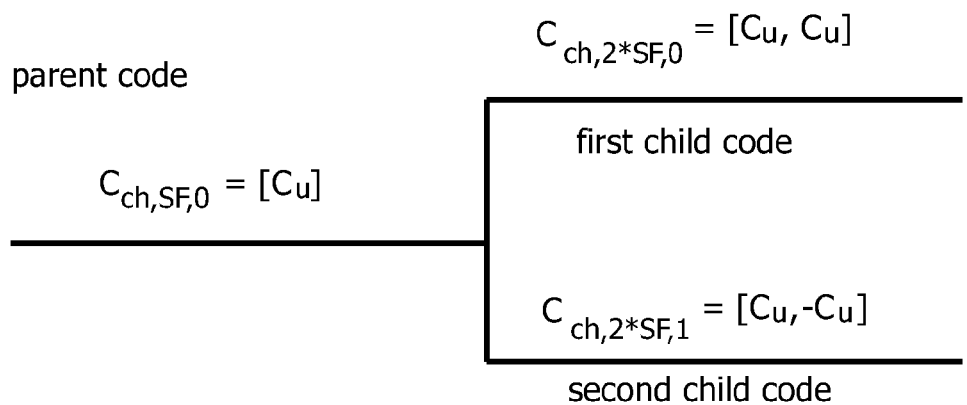
FIG. 4 shows a structural representation of a parent code and its two child codes.

FIG. 4 shows a structural representation of a parent code and its two child codes. Despreading with the two child codes of the despreading unit $C_u$, i.e., despreading with $C_1=[C_u,C_u]$ and $C_2=[C_u,-C_u]$ will provide the two code multiplexed pseudo-symbol estimates reflected from the two consecutive symbols on $C_u$ as $$\hat{a}(m) = \hat{a}_u(2m-1) + \hat{a}_u(2m)$$

$$\hat{a}_2(m) = \hat{a}_u(2m-1) - \hat{a}_u(2m)$$

where m represents the symbol index.

Partitioning these pseudo-symbols into their I-Q components will lead to the following result:

$$\hat{a}_{1,I}(m) = \hat{a}_{u,I}(2m-1) + \hat{a}_{u,I}(2m) \quad (3)$$

$$= a_{u,I}(2m-1) + a_{u,I}(2m) + n_{u,I}(2m-1) + n_{u,I}(2m)$$

$$= a_{1,I}(m) + n_{1,I}(m)$$

$$\hat{a}_{2,I}(m) = \hat{a}_{u,I}(2m-1) - \hat{a}_{u,I}(2m)$$

$$= a_{u,I}(2m-1) - a_{u,I}(2m) + n_{u,I}(2m-1) - n_{u,I}(2m)$$

$$= a_{2,I}(m) + n_{2,I}(m)$$

Since the real part (imaginary part) of QPSK modulation has only two values i.e. a scaled form of $\{+1, -1\}$, either $a_{1,I}(m)$ or $a_{2,I}(m)$ has to be equal to zero. Both cannot be non-zero at the same time.

In view of the properties of the denominator of equation (2), the following applies:

$$\sigma_{n_1,I}^2 = \sigma_{n_2,I}^2 = 2\sigma_{n_u,I}^2$$

The I (real) component of the noise-plus-interference sample variance can be easily calculated as:

$$\sigma_{n_u,I}^2 = \frac{\min\{|\hat{a}_{1,I}(m)|^2, |\hat{a}_{2,I}(m)|^2\}}{2}$$

Similar reasoning and procedure can be followed to obtain the Q (imaginary) component.

$$\sigma_{n_u,Q}^2 = \frac{\min\{|\hat{a}_{1,Q}(m)|^2, |\hat{a}_{2,Q}(m)|^2\}}{2}$$

Finally, the following expression is obtained:

$$\sigma_{n_u}^2 = \sigma_{n_u,I}^2 + \sigma_{n_u,Q}^2$$

Figure 5:
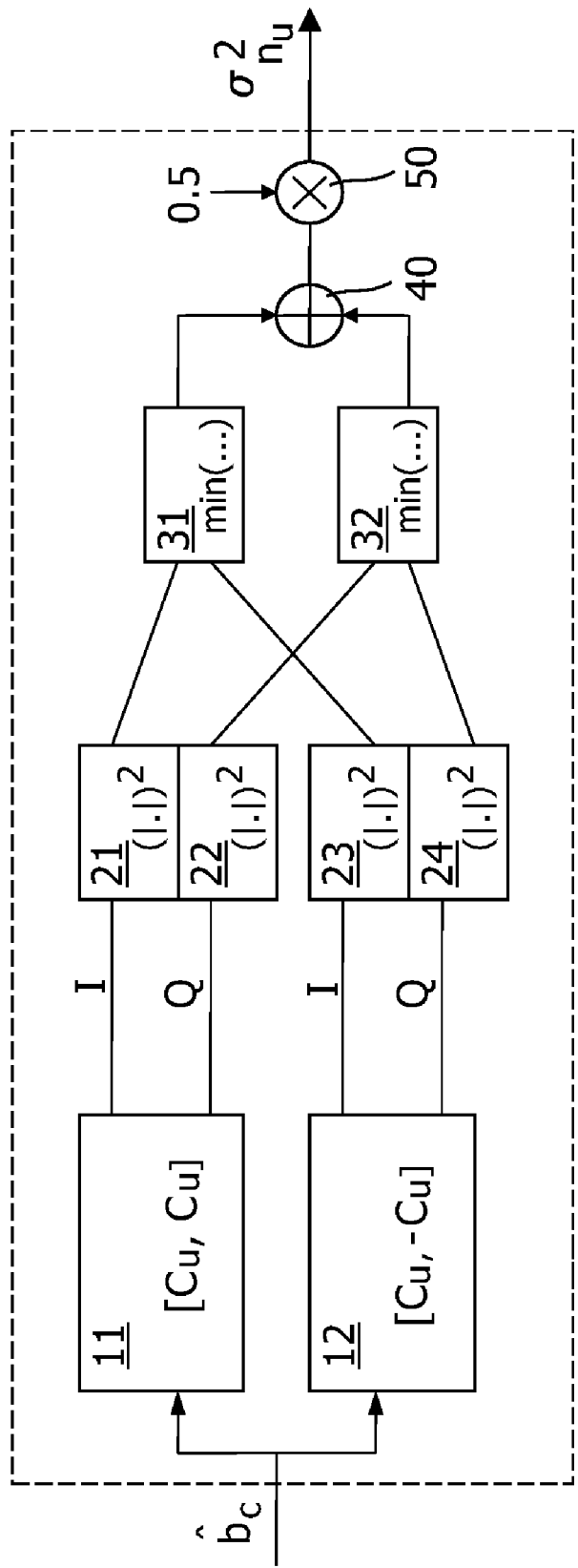
FIG. 5 shows a schematic block diagram of an estimation apparatus according to the preferred embodiment.

FIG. 5 shows a schematic block diagram of the implementation architecture with comparators and scaling operations.

According to FIG. 5, two equal-amplitude symbols of same or at least similar amplitude of the estimated descrambled total chip level signal, e.g., two consecutive symbols, are added in an adding unit 11 and subtracted in a subtracting unit 12, which output real and imaginary parts I and Q of the adding and subtracting results, respectively. Then, energy values of all real and imaginary parts are obtained at respective squaring units 21 to 24. Minimum energies of the respective real and imaginary parts are obtained by comparing the respective energy values of real and imaginary parts simple using two-input comparators 31 and 32. These minimum energies of the real and imaginary parts are added in an adder unit 40. Since two symbols are used, the output of the adder unit 40 can be normalized by dividing it by 2 (multiplying it by 0.5) in a final multiplying or dividing unit 50, to obtain the desired noise-plus-interference variance $\sigma_{nu}^2$.

The quality of the estimated variance can be improved in several ways. As a first option, a moving averaging of the estimated values can be determined during a predetermined number of consecutive symbol instants. As a second option, the procedure can be applied on a number of other known codes with QPSK modulation like some common codes as the Common Pilot Channel (CPICH) or the PCCPCH and then do weighted averaging among them. For this purpose, the estimate of $\sigma_n^2$ can be obtained from the $\sigma_{n_u}^2$ estimate over each known code by using the relations $\sigma_{n_u}^2 = L_u \sigma_n^2$ as given in equation (2). Then weighted averaging is performed among the variances obtained in the first step. Weighting would be beneficial since, for example an estimate of $\sigma_n^2$ from a code with spreading factor L=128 would in ideal conditions have 8 times less variance than an estimate of $\sigma_n^2$ from a code with spreading factor L=16. On the other hand some phase drift impacts at the synchronization modules might favour giving more weight to low spreading factors than the case in ideal conditions. In principle, both moving averaging and inter-code averaging could be applied.

The proposed estimation scheme can be applied on any active code with QPSK modulation, meaning that it can also be applied on any unused code as long as there is no activity on its parent or child codes. That unused code can be considered as a QPSK modulated code with zero power.

Once the variance $\sigma_n^2$ is estimated and refined by the explained mechanisms, it can be used in the SINR estimation of any user symbol regardless of the symbol constellation. For this purpose, the symbol-plus-noise-plus-interference power $\sigma_{\hat{a}_u}^2 = \sigma_{a_u}^2 + \sigma_{n_u}^2$ can be estimated first by simply taking the power at the correlator output, and then subtracting the estimated variance $\sigma_{n_u}^2$ from $\sigma_{\hat{a}_u}^2$ to obtain the symbol power $\sigma_{a_u}^2$ and finally obtain the SINR estimate as in equation (2). The symbol amplitude estimate can be easily obtained from the symbol power estimate. For QPSK modulation, for example, the amplitude of the real and imaginary symbol parts will simply be $$\sqrt{\frac{\sigma_{a_u}^2}{2}}.$$

Consequently, as long as two QPSK symbol estimates, which have the same amplitude and the same spreading factor are available, the proposed estimation can be easily applied by adding and subtracting the symbol estimates and doing the essential comparisons. In a multicode transmission system such as HSDPA for example, the mobile terminal receives multiple QPSK symbols over multiple codes at spreading factor 16. Moreover, they have an equal amplitude. Hence, the technique can be used exactly as explained among the symbol couples. Two symbol estimates are simply added and subtracted. The minimum energy components of the real and imaginary results are added and the result is divided by two. This procedure can be repeated among all symbol couples and the obtained estimates are averaged to obtain better results, if desired. As an example, five HSDPA symbols are assumed. Then, there are C(5,2)=10 symbol couples. The proposed estimation can be applied ten times and the average is determined.

It should be understood that the functions or blocks of FIG. 5 can be implemented with discrete circuit elements, or as software routines which are executed by a suitable data processor. A combination of circuit elements and software routines may also be employed.

It is to be noted that the present invention is not restricted to the above preferred embodiment, and can be implemented in any linear receiver, such as a Rake receiver, linear minimum mean square error (LMMSE) equalizers, and linear multi-user detectors (interference cancellers), to obtain a simple unbiased variance estimation or estimator of any interference, distortion and/or noise component, which is based on the properties of linear receivers, orthogonal codes and the QPSK constellation. Moreover, the proposed noise variance estimation can be used for estimation of any noise, interference or distortion component. Any combination of the minimum energy components may be used depending on the code types, spreading factors or other characteristic parameters of the estimated symbols.

The estimated noise-plus-interference variance can be used for several other estimation purposes like SINR and amplitude estimation of the same code or any other active code in the system. These latter codes, which benefit from this estimate, do not have to have the same spreading factor as the code used for the estimation. Moreover they can even carry symbols from any constellation.

In summary, a method and apparatus for estimating a noise variance in a receiver of a code multiplex telecommunications system with orthogonal spreading codes have been described, wherein respective real and imaginary parts of a sum and a difference of two estimated symbols having substantially same amplitudes are determined, and then respective minimum energy components of the determined real and imaginary parts of the sum and difference are determined. The respective minimum energy components are finally combined to obtain the noise variance. Thereby, noise variance can be estimated based on simple addition and comparison operations, which reduces complexity and processing load.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The invention claimed is:

1. An apparatus for estimating a noise variance in a receiver of a code multiplex telecommunications system with orthogonal spreading codes, said apparatus comprising:
    a processing unit for processing two successive despread QPSK estimated symbols having substantially same amplitudes of the estimated descrambled total chip level signal and received at successive non-coincident instants;
    an adding unit for adding said successive QPSK symbols and for outputting real and imaginary parts;
    a subtracting unit for subtracting said successive QPSK symbols at successive non-coincident instants and for outputting real and imaginary parts;
    a first set of squaring units for determining the energy values of said real and imaginary parts outputted by said adding unit;
    a second set of squaring units for determining the energy values of said real and imaginary parts outputted by said subtracting unit;
    a first comparator for comparing the energy value of the imaginary part of said adding and subtracting units;
    a second comparator for comparing the energy value of the real part of said adding and subtracting units;
    an adder unit for adding a minimum energy value associated with the imaginary parts with a minimum value associated with the real parts; and
    a multiplying or dividing unit coupled to the adder unit for generating an estimation of the noise variance.

2. The apparatus according to claim 1, wherein said estimated symbols are spread by the same spreading factor.

3. The apparatus according to claim 1, wherein said estimated symbols are consecutive estimated symbols.

4. The apparatus according to claim 1, wherein said combining unit comprises adding unit to add said respective minimum energy components and dividing unit to divide the output of said adding unit by two.

5. The apparatus according to claim 1, wherein said apparatus is adapted to determine a moving average of estimated noise variances during a predetermined number of consecutive symbols.

6. The apparatus according to claim 1, wherein said apparatus is adapted to obtain estimated noise variances for at least two different codes, and to apply a weighted average among said at least two different codes.

7. The apparatus according to claim 6, wherein said apparatus is adapted to apply weighting based on respective spreading factors of said at least two different codes.

8. The apparatus according to claim 1, wherein said noise variance is a noise-plus-interference variance.

9. An apparatus according to claim 1, wherein the apparatus comprises a receiver apparatus for a code multiplex telecommunications system with orthogonal spreading codes.

10. The apparatus according to claim 9, wherein said receiver apparatus is adapted to use said estimated noise variance for an estimation of a signal-to-noise-plus-interference ratio.

11. The apparatus according to claim 9, wherein said receiver apparatus is adapted to use said estimated noise variance for an amplitude estimation.

12. A method of estimating a noise variance in a receiver of a code multiplex telecommunications system with orthogonal spreading codes, said method comprising:
    processing of two successive despread QPSK estimated symbols having substantially same amplitudes of the estimated descrambled total chip level signal and received at successive non-coincident instants;
    adding two equal-amplitude QPSK symbols for the purpose of outputting the real and imaginary parts;
    subtracting said QPSK symbols for the purpose of outputting real and imaginary parts;
    calculating energy values of said real and imaginary parts resulting from said addition;
    calculating energy values of said real and imaginary parts resulting from said subtraction;
    comparing the energy values of said real parts respectively resulting from said addition and said subtraction in order to determine minimum energy values associated with said real parts;
    comparing the energy values of said imaginary parts respectively resulting from said subtraction in order to determine minimum energy values associated with said imaginary parts;
    adding the minimum energy values associated with said real parts to the minimum energy values associated with said imaginary parts; and
    normalizing the added minimum energy values in order to obtain an estimation of the noise variance.

13. The method according to claim 12, wherein said estimated symbols are spread by the same spreading factor.

14. The method according to claim 12, wherein said estimated symbols are consecutive estimated symbols.

15. The method according to claim 12, further comprising determining a moving average of estimated noise variances during a predetermined number of consecutive symbols.

16. The method according to claim 12, further comprising obtaining estimated noise variances for at least two different codes, and to apply a weighted average among said at least two different codes.

17. The method according to claim 16, further comprising applying weighting based on respective spreading factors of said at least two different codes.

18. The method according to claim 12, wherein said noise variance comprises a noise-plus-interference variance.

19. The method according to claim 12 performed on a receiver apparatus for a code multiplex telecommunications system with orthogonal spreading codes.

20. The method according to claim 19, wherein said receiver apparatus is adapted to use said estimated noise variance for an estimation of a signal-to-noise-plus-interference ratio.

21. The method according to claim 19, wherein said receiver apparatus is adapted to use said estimated noise variance for an amplitude estimation.

* * * * *